United States Patent
Bagin et al.

(10) Patent No.: US 9,145,077 B2
(45) Date of Patent: Sep. 29, 2015

(54) HEADREST

(75) Inventors: Juraj Bagin, Dubnica nad Vahom (SK); Lars Lettenmayer, Neunkirchen-Seelscheid (DE)

(73) Assignee: Johnson Controls GmbH, Burscheid (DE)

( * ) Notice: Subject to any disclaimer, the term of this patent is extended or adjusted under 35 U.S.C. 154(b) by 32 days.

(21) Appl. No.: 13/806,685

(22) PCT Filed: Jun. 17, 2011

(86) PCT No.: PCT/EP2011/003010
§ 371 (c)(1),
(2), (4) Date: Feb. 27, 2013

(87) PCT Pub. No.: WO2011/160795
PCT Pub. Date: Dec. 29, 2011

(65) Prior Publication Data
US 2013/0207436 A1    Aug. 15, 2013

(30) Foreign Application Priority Data
Jun. 22, 2010    (DE) .......................... 10 2010 024 637

(51) Int. Cl.
*A47C 1/10* (2006.01)
*B60N 2/48* (2006.01)
*B60N 2/68* (2006.01)

(52) U.S. Cl.
CPC ............ *B60N 2/4802* (2013.01); *B60N 2/4808* (2013.01); *B60N 2/682* (2013.01)

(58) Field of Classification Search
CPC ............... B60N 2/4808; B60N 2/4885; B60N 2002/4897
USPC ........................... 297/391, 410, 463.1, 463.2
See application file for complete search history.

(56) References Cited

U.S. PATENT DOCUMENTS

| 4,854,642 | A | | 8/1989 | Vidwans et al. |
| 5,080,437 | A | * | 1/1992 | Pesta et al. ..................... 297/410 |
| 5,378,043 | A | * | 1/1995 | Viano et al. .................... 297/408 |
| 5,397,170 | A | * | 3/1995 | Shrock ....................... 297/452.18 |
| 5,816,658 | A | * | 10/1998 | Wallis .............................. 297/410 |
| 7,255,400 | B2 | * | 8/2007 | Holdampf ....................... 297/391 |
| 7,318,626 | B2 | * | 1/2008 | Ohchi et al. ................... 297/410 |
| 8,167,376 | B2 | * | 5/2012 | Song .............................. 297/410 |
| 8,348,338 | B2 | * | 1/2013 | Galecka et al. ............ 297/216.12 |
| 8,397,349 | B2 | * | 3/2013 | Nishiura et al. ............. 24/115 R |

(Continued)

FOREIGN PATENT DOCUMENTS

| CN | 201403859 Y | 2/2010 |
| DE | 10 2008 038 850 A1 | 2/2010 |

(Continued)

OTHER PUBLICATIONS

International Search Report and English Translation received in connection with international application No. PCT/EP2011/003010 dtd Dec. 15, 2011.

(Continued)

*Primary Examiner* — Laurie Cranmer
(74) *Attorney, Agent, or Firm* — Foley & Lardner LLP

(57) ABSTRACT

A head rest has a head rest cushion which is provided on at least one holding rod. The holding rod is supported in a holding member that is fixed to the frame of a vehicle seat backrest by a connecting member.

5 Claims, 1 Drawing Sheet

(56) References Cited

U.S. PATENT DOCUMENTS

| | | | |
|---|---|---|---|
| 2003/0222492 A1* | 12/2003 | Nemoto et al. | 297/410 |
| 2005/0035641 A1 | 2/2005 | Peterson | |
| 2005/0127736 A1 | 6/2005 | Ohchi et al. | |
| 2006/0261661 A1* | 11/2006 | Kraft et al. | 297/463.1 |

FOREIGN PATENT DOCUMENTS

| | | |
|---|---|---|
| DE | 20 2010 007 559 U1 | 6/2011 |
| FR | 2 414 417 A1 | 8/1979 |
| FR | 2 765 842 A1 | 1/1999 |
| JP | 61-111351 | 7/1986 |
| JP | 2002-315649 | 10/2002 |

OTHER PUBLICATIONS

English translation of the International Preliminary Report on Patentability received in connection with international patent application No. PCT/EP2011/003010; dtd Jan. 14, 2013.

Office Action in corresponding Japanese Patent Application No. 2013-515755.

Office Action dated Aug. 29, 2014, in corresponding Chinese Application No. 201180031213.5, and English translation, 11 pages.

* cited by examiner

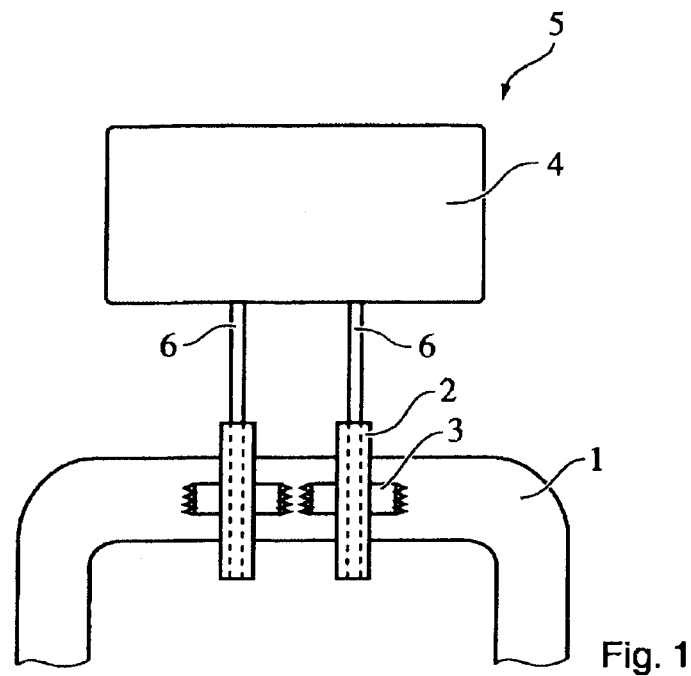
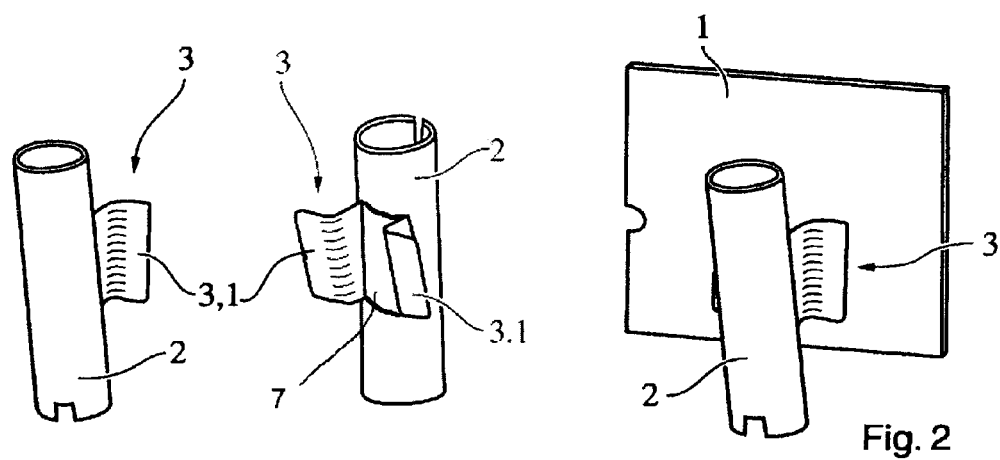

HEADREST

CROSS REFERENCE TO RELATED APPLICATIONS

The present application is a National Stage of International Application No. PCT/EP2011/003010 filed on Jun. 17, 2011, which claims the benefit of German Patent Application No. 10 2010 024 637.9 filed on Jun. 22, 2010, the entire disclosures of which are incorporated herein by reference.

The present invention relates to a headrest comprising a headrest cushion which is provided on at least one holding rod supported in a holding means which is fastened to the frame of a vehicle seat backrest by a connecting means.

Such headrests are sufficiently known from the prior art. In the case of such mass-produced items, however, there is always the object to simplify the assembly thereof or to save weight.

It was an object of the present invention, therefore, to provide a headrest which is easier to assemble and lighter than headrests according to the prior art.

The object is achieved by a headrest comprising a headrest cushion which is provided on at least one holding rod supported in a holding means which is fastened to the frame of a vehicle seat by a connecting means, wherein the holding means and the connecting means are provided in one piece.

The present invention relates to a headrest which is arranged on the backrest of a motor vehicle seat or on the vehicle body and is generally supported on the frame of said backrest. Such headrests have a headrest cushion which is provided on at least one, often two, holding rods. Each holding rod is supported in a holding means which is fastened to the frame of the backrest of the vehicle seat by a connecting means. According to the invention, it is now provided that the holding means and the connecting means are provided in one piece. This firstly saves an assembly step, specifically the connection of the holding means to the connecting means. Furthermore, the headrest according to the invention is lighter because no additional connecting means has to be provided. The invention also encompasses an embodiment in which the holding rod and the holding means are provided in one piece.

It is preferable for the connecting means to be shaped from the holding means. By way of example, the holding means is provided in tubular form and the connecting means are cut out or notched out of the holding means and then provided with the desired shape. It is important in this respect that they also remain in one piece during this machining.

In another preferred embodiment, the connecting means and the holding means are manufactured as a cast part, an injection-molded part and/or a molded part.

It is preferable for the connecting means to have an angled region, which rests in particular areally on the frame of the backrest. The angled region can be formed by reshaping the portion which has been shaped from the holding means. It is preferable for the angled region to have a planar surface which rests areally, for example, on the frame of the vehicle seat. As a result, it is possible, for example, to increase the size of the connection area between the connecting means and the frame, and to improve the connection, for example by welding, riveting or some other form-fitting, force-fitting and/or integral connection. It is very particularly preferable for the angled region to be connected to the frame of the vehicle seat or to the vehicle body by laser welding. The laser beam in this case is preferably directed at the angled region.

It is preferable for the holding means to have a tubular form, in particular with a round cross section.

It is preferable for the holding means and the connecting means to be produced from metal, in particular steel, preferably sheet steel or extruded steel.

Hereinbelow, the invention will be explained with reference to FIGS. 1 and 2. These explanations are merely exemplary and do not limit the general concept of the invention.

FIG. 1 shows the headrest according to the invention.

FIG. 2 shows the design of the holding and connecting means in one piece.

FIG. 1 shows the headrest 5 according to the invention. Said headrest has a headrest cushion on which two holding rods 6 are arranged. These holding rods 6 are inserted into tubular holding means 2, where they are supported in particular in a vertically displaceable manner. A person skilled in the art recognizes that these can also be supported nondisplaceably in the holding means 2, however. Furthermore, a person skilled in the art recognizes that the holding rods 6 and the holding means 2 can also be provided in one piece. According to the invention, the holding means 2 is provided in one piece with a connecting means 3, which is connected to the frame 1 in a force-fitting, form-fitting and/or integral manner. In the present case, the connecting means is welded to the frame 1 of the backrest. The welding is preferably effected by laser welding, in particular by directing a laser beam at the angled region 3.1 (cf. FIG. 2) of the connecting means 3.

FIG. 2 shows an embodiment of the holding/connecting means 2, 3 in one piece. In the present case, the holding means is provided as a round tube; the material for the connecting means 3 is cut out from the wall material of the tube such that the wall material will have a void 7 along only a portion of a length of the wall material at a location from which the connecting means 3 is cut. The connecting means 3 extends away from the void 7 and is then bent accordingly in such a way that it has one or two angled regions 3.1, here ears for example, which are then each connected, here welded, in particular laser-welded, to the frame 1 of the backrest. By virtue of the angled regions 3.1, the size of the connection area/contact surface between the connecting means 3 and the frame 1 is increased and a laser-welded connection between the angled region and the frame 1 can be implemented more easily and more effectively.

LIST OF REFERENCE SIGNS

1 Frame
2 Holding means for the headrest rods
3 Connecting means for connecting the holding means to the frame
3.1 Angled region
4 Headrest cushion
5 Headrest
6 Holding rods for the headrest cushion
Void

The invention claimed is:
1. A headrest comprising:
at least one holding rod;
a headrest cushion which is provided on the at least one holding rod;
a holder, wherein the at least one holding rod is supported in the holder; and
a connector that is configured to fasten the holder to a frame of a vehicle seat or to a vehicle body,
wherein the holder comprises a substantially round tube that is one piece of wall material,
wherein the holder and the connector are both part of the one piece of wall material, wherein the connector is cut from the one piece of wall material of the tube such that the one piece of wall material will have a void along only a portion of a length of the wall material at a location from which the connector is cut, wherein the connector extends away from the void and is bent to form at least one angled region, wherein the at least one angled region is bent along a length of the connector and away from a longitudinal axis of the holder to provide a planar surface which provides an area for connection to the frame, wherein the planar surface extends beyond a width and thickness of the holder.

2. The headrest as claimed in claim 1 wherein the angled region is permanently connected to the frame.

3. The headrest of claim 2, wherein the permanent connection is welding.

4. The headrest of claim 3, wherein the welding is laser-welding.

5. The headrest as claimed in claim 1 wherein the holder has a tubular form.

* * * * *